US010698788B2

(12) United States Patent
Yeh et al.

(10) Patent No.: US 10,698,788 B2
(45) Date of Patent: Jun. 30, 2020

(54) METHOD FOR MONITORING SERVER, AND MONITORING DEVICE AND MONITORING SYSTEM USING THE SAME

(71) Applicant: Wistron Corporation, New Taipei (TW)

(72) Inventors: Chung-Chieh Yeh, New Taipei (TW); Ming-Sheng Wu, New Taipei (TW)

(73) Assignee: Wiwynn Corporation, New Taipei (TW)

(*) Notice: Subject to any disclaimer, the term of this patent is extended or adjusted under 35 U.S.C. 154(b) by 49 days.

(21) Appl. No.: 15/013,977

(22) Filed: Feb. 2, 2016

(65) Prior Publication Data
US 2017/0097880 A1    Apr. 6, 2017

(30) Foreign Application Priority Data
Oct. 2, 2015    (TW) .............................. 104132648 A

(51) Int. Cl.
*G06F 11/30*    (2006.01)
*G06F 11/34*    (2006.01)
*G06F 11/32*    (2006.01)

(52) U.S. Cl.
CPC ...... *G06F 11/3495* (2013.01); *G06F 11/3003* (2013.01); *G06F 11/3031* (2013.01);
(Continued)

(58) Field of Classification Search
CPC .......... G06F 11/30; G06F 11/32; G06F 11/34; G06F 11/3495; G06F 11/3003;
(Continued)

(56) References Cited

U.S. PATENT DOCUMENTS 7,493,598 B1 *   2/2009   Craggs ................ G06F 11/3636
                                                         714/38.1
7,698,399 B2     4/2010   Huang
                          (Continued)

FOREIGN PATENT DOCUMENTS

CN    103441861    12/2013
TW    I255996      6/2006
             (Continued)

OTHER PUBLICATIONS

The Basics of Low-Power Programming on the Cortex-M0 by Joseph Yiu Oct. 25, 2011 https://www.embedded.com/print/4230085 (Year: 2011).*

(Continued)

*Primary Examiner* — Joseph O Schell
(74) *Attorney, Agent, or Firm* — Winston Hsu

(57) ABSTRACT

A method for monitoring a server, a monitoring device and a monitoring system are provided. The method includes: setting a system event to be monitored from the server; setting a trigger recording mode and a predetermined recording amount for recording system information of the server; capturing the system information related to the system event from a baseboard management controller (BMC) managing the server into a storage circuit according to the trigger recording mode and the predetermined recording amount; and displaying the system information stored in the storage circuit on an user interface.

10 Claims, 5 Drawing Sheets

(52) U.S. Cl.
CPC ...... *G06F 11/3466* (2013.01); *G06F 11/3058* (2013.01); *G06F 11/3072* (2013.01); *G06F 11/323* (2013.01); *G06F 2201/86* (2013.01)

(58) Field of Classification Search
CPC ............. G06F 11/3031; G06F 11/3058; G06F 11/30685; G06F 11/3072
See application file for complete search history.

(56) References Cited

U.S. PATENT DOCUMENTS

| | | | | |
|---|---|---|---|---|
| 2005/0049924 | A1* | 3/2005 | DeBettencourt | H04L 43/028 705/21 |
| 2008/0066083 | A1* | 3/2008 | Ladd | G06F 11/2268 719/318 |
| 2008/0168242 | A1* | 7/2008 | Eberbach | G06F 11/004 711/161 |
| 2009/0089624 | A1* | 4/2009 | Austen | G06F 11/0727 714/39 |
| 2013/0185402 | A1* | 7/2013 | Ayanam | H04L 41/0813 709/221 |
| 2013/0219229 | A1* | 8/2013 | Sugimoto | G06F 11/0724 714/45 |
| 2014/0089744 | A1* | 3/2014 | Oshiro | G06F 11/08 714/48 |
| 2014/0280469 | A1* | 9/2014 | Messer | H04L 67/42 709/203 |
| 2015/0121152 | A1* | 4/2015 | Chen | G06F 9/4406 714/47.1 |
| 2015/0143182 | A1* | 5/2015 | Rajamanickam | G06F 11/0781 714/48 |
| 2016/0011928 | A1* | 1/2016 | Fujiwara | G06F 11/3476 714/45 |
| 2017/0039100 | A1* | 2/2017 | Mashimo | G06F 11/34 |

FOREIGN PATENT DOCUMENTS

| | | |
|---|---|---|
| TW | I275933 | 3/2007 |
| TW | 200945030 | 11/2009 |
| TW | 201118564 | 6/2011 |

OTHER PUBLICATIONS

"Office Action of Taiwan Counterpart Application" with partial English translation, dated Apr. 14, 2016, p. 1-p. 8, in which the listed references were cited.

\* cited by examiner

METHOD FOR MONITORING SERVER, AND MONITORING DEVICE AND MONITORING SYSTEM USING THE SAME

CROSS-REFERENCE TO RELATED APPLICATION

This application claims the priority benefit of Taiwan application serial no. 104132648, filed on Oct. 2, 2015. The entirety of the above-mentioned patent application is hereby incorporated by reference herein and made a part of this specification.

BACKGROUND OF THE INVENTION

Field of the Invention

The invention relates to a method for monitoring a server, a monitoring device and a monitoring system.

Description of Related Art

Intelligent platform management interface (IPMI) is an industrial standard established by Intel Corp. for enterprise system peripherals. Moreover, the IPMI is also a free and open standard, and a user may use such standard without extra cost. The IPMI may cross over different operating systems, firmware and hardware platforms, and may intelligently monitor, control and automatically report operating statuses of a large amount of servers, so as to decrease server system cost.

Generally, the IPMI is the standard used by a baseboard management controller (BMC) for managing the server. However, when the BMC uses the IPMI to manage the server, there is a common problem that is not defined in the IPMI. Such problem is that although the BMC itself may monitor a status of the hardware in the server, and may set a threshold for combining with a system event log (SEL) or a platform event filter (PEF) to notify a remote computer that an abnormal circumstance occurs, it is lack of an oscilloscope-like function. Namely, once an abnormal signal or abnormal circumstance occurs, since the current BMC does not continuously record a status of the whole system as that does of an oscilloscope when the server is operating, when the server encounters a problem later, the status of the system at the moment when the problem occurs cannot be traced. In other words, according to the current method, only the problem occurred when the server is operating can be learned, but the reason that causes the problem cannot be learned due to that the system status before occurrence of the problem is not recorded. If the above problem can be resolved, debugging convenience of a system manager will be improved.

SUMMARY OF THE INVENTION

The invention is directed to a method for monitoring a server, a monitoring device and a monitoring system, by which a system status before and/or after the server encounters a problem is captured, so as to facilitate a system manager to trace the system status at the moment when the problem occurs.

The invention provides a method for monitoring a server, which includes following steps. A system event to be monitored from the server is set. A trigger recording mode and a predetermined recording amount for recording system information of the server are set. The system information related to the system event is captured from a baseboard management controller (BMC) managing the server for storing into a storage circuit according to the trigger recording mode and the predetermined recording amount. The system information stored in the storage circuit is displayed on a user interface.

In an embodiment of the invention, the trigger recording mode includes a pre-trigger recording mode, and the step of capturing the system information related to the system event from the baseboard management controller managing the server for storing into the storage circuit according to the trigger recording mode and the predetermined recording amount includes following steps. When the server is operating, the system information and time stamps thereof from the baseboard management controller are continuously captured for storing into a register. Occurrence of the system event is waited. When the system event occurs, the operation of capturing the system information and the time stamps thereof from the baseboard management controller for storing into the register is stopped, and specific system information recorded before occurrence of the system event is captured from the register, where an amount of the specific system information is the predetermined recording amount.

In an embodiment of the invention, the trigger recording mode includes a post-trigger recording mode, and the step of capturing the system information related to the system event from the baseboard management controller managing the server for storing into the storage circuit according to the trigger recording mode and the predetermined recording amount includes following steps. When the server is operating, occurrence of the system event is waited. When the system event occurs, specific system information recorded after occurrence of the system event is captured from the baseboard management controller, where an amount of the specific system information is the predetermined recording amount.

In an embodiment of the invention, the trigger recording mode includes a middle recording mode, and the predetermined recording amount includes a first predetermined recording amount and a second predetermined recording amount. Moreover, the step of capturing the system information related to the system event from the baseboard management controller managing the server for storing into the storage circuit according to the trigger recording mode and the predetermined recording amount includes following steps. When the server is operating, the system information and time stamps thereof from the baseboard management controller are continuously captured for storing into a register. Occurrence of the system event is waited. When the system event occurs, the system information of a second predetermined recording amount and time stamps thereof from the baseboard management controller are continuously captured for storing into the register, and first specific system information recorded before occurrence of the system event and second specific system information recorded after occurrence of the system event are captured from the register, where an amount of the first specific system information is the first predetermined recording amount, and an amount of the second specific system information is the second predetermined recording amount.

In an embodiment of the invention, the system information includes at least one of a power-on self test (POST) code of a basic input/output system (BIOS), a module-specific register (MSR) of a central processing unit (CPU), a serial over LAN (SOL; and LAN=local area network), and a debug console of the BIOS, a general purpose input/output (GPIO) state of the server, a sensor of the baseboard management controller, a keyboard/video/mouse over Internet protocol (iKVM) image and a fan speed.

The invention provides a monitoring device including a storage circuit and a processor. The storage circuit stores a plurality of modules. The processor is coupled to the storage circuit, and accesses and executes the modules. The modules include a system setting module, a system information capturing module and a display module. The system setting module sets a system event to be monitored from the server, and sets a trigger recording mode and a predetermined recording amount for recording system information of the server. The system information capturing module captures the system information related to the system event from a baseboard management controller (BMC) managing the server according to the trigger recording mode and the predetermined recording amount. The display module displays the system information on a user interface.

In an embodiment of the invention, the trigger recording mode includes a pre-trigger recording mode, and the system information capturing module is configured to continuously capture the system information and time stamps thereof from the baseboard management controller for storing into a register when the server is operating; wait for occurrence of the system event; stop capturing the system information and the time stamps thereof from the baseboard management controller for storing into the register when the system event occurs, and capture specific system information recorded before occurrence of the system event from the register, where an amount of the specific system information is the predetermined recording amount.

In an embodiment of the invention, the trigger recording mode includes a post-trigger recording mode, and the system information capturing module is configured to wait for occurrence of the system event when the server is operating; and capture specific system information and time stamps thereof recorded after occurrence of the system event from the baseboard management controller when the system event occurs, where an amount of the specific system information is the predetermined recording amount.

In an embodiment of the invention, the trigger recording mode includes a middle recording mode, and the predetermined recording amount includes a first predetermined recording amount and a second predetermined recording amount, and the system information capturing module is configured to continuously capture the system information and time stamps thereof from the baseboard management controller for storing into a register when the server is operating; wait for occurrence of the system event; continuously capture the system information of the second predetermined recording amount and time stamps thereof from the baseboard management controller for storing into the register when the system event occurs; and capture first specific system information recorded before occurrence of the system event and second specific system information recorded after occurrence of the system event from the register, where an amount of the first specific system information is the first predetermined recording amount, and an amount of the second specific system information is the second predetermined recording amount.

The invention provides a monitoring system including a decision device, a capturing device and a display device. The decision device sets a system event to be monitored from a server, and sets a trigger recording mode and a predetermined recording amount for recording system information of the server. The capturing device is coupled to the decision device, and captures the system information related to the system event from a baseboard management controller (BMC) managing the server for storing into a storage circuit according to the trigger recording mode and the predetermined recording amount. The display device displays the system information stored in the storage circuit on a user interface.

In an embodiment of the invention, the trigger recording mode includes a pre-trigger recording mode, and the capturing device is configured to continuously capture the system information and time stamps thereof from the baseboard management controller for storing into a register when the server is operating; wait for occurrence of the system event; stop capturing the system information and the time stamps thereof from the baseboard management controller for storing into the register when the system event occurs, and capture specific system information recorded before occurrence of the system event from the register, where an amount of the specific system information is the predetermined recording amount.

In an embodiment of the invention, the trigger recording mode includes a post-trigger recording mode, and the capturing device is configured to wait for occurrence of the system event when the server is operating; and capture specific system information and time stamps thereof recorded after occurrence of the system event from the baseboard management controller when the system event occurs, where an amount of the specific system information is the predetermined recording amount.

In an embodiment of the invention, the trigger recording mode includes a middle recording mode, and the predetermined recording amount includes a first predetermined recording amount and a second predetermined recording amount, and the capturing device is configured to continuously capture the system information and time stamps thereof from the baseboard management controller for storing into a register when the server is operating; wait for occurrence of the system event; continuously capture the system information of the second predetermined recording amount and time stamps thereof from the baseboard management controller for storing into the register when the system event occurs; and capture first specific system information recorded before occurrence of the system event and second specific system information recorded after occurrence of the system event from the register, where an amount of the first specific system information is the first predetermined recording amount, and an amount of the second specific system information is the second predetermined recording amount.

According to the above description, according to the method for monitoring a server, the monitoring device and the monitoring system of the invention, the predetermined amount of system information recorded before and/or after occurrence of the system event can be captured according to the used trigger recording mode.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
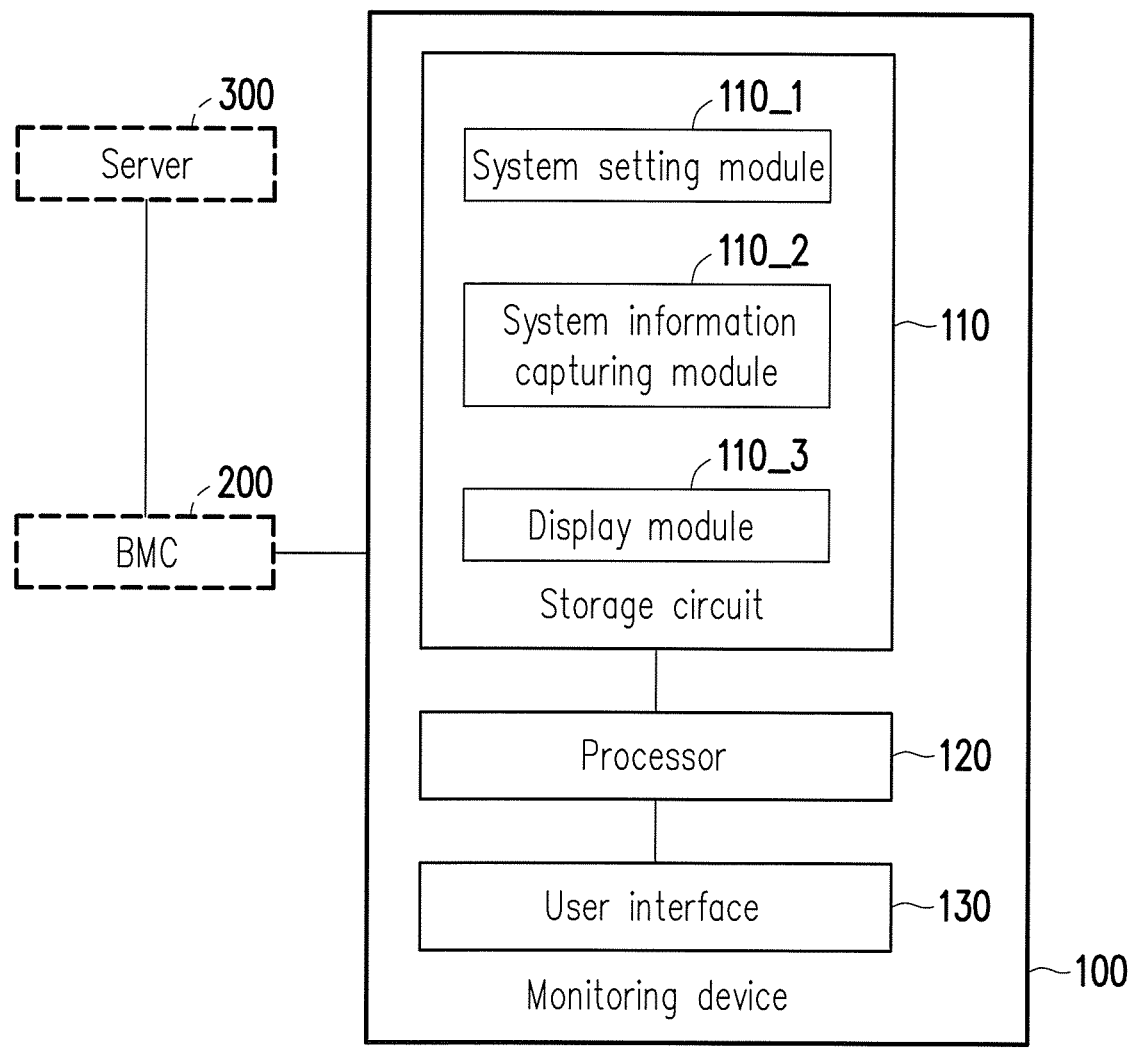
FIG. 1 is a schematic diagram of a monitoring device according to an embodiment of the invention.

FIG. 1 is a schematic diagram of a monitoring device according to an embodiment of the invention. In the present embodiment, the monitoring device 100 includes a storage circuit 110, a processor 120 and a user interface 130. The storage circuit 110 is, for example, a memory, a hard drive or a any other device capable of storing data, and is configured to record a plurality of program codes or modules. The processor 120 is coupled to the storage circuit 110, and is, for example, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), any other type of an integrated circuit, a state machine, an advanced RISC machine (ARM)-based processor and similar products. The user interface 130 is coupled to the processor 120, and can be a liquid-crystal display (LCD), a plasma display, a vacuum fluorescent display, a light-emitting diode (LED) display, a field emission display (FED) and/or other suitable type of display.

In the present embodiment, the monitoring device 100 can be connected to a BMC 200 managing a server 300 through a bus and various wired or wireless connection manners. Moreover, the monitoring device 100 may capture system information related to a system event occurred on the server 300 from the BMC 200. In this way, a system manager may debug according to the system information, which is described in detail later.

In an embodiment, the processor 120 may access and execute a system setting module 110_1, a system information capturing module 110_2 and a display module 110_3 in the storage circuit 110 to execute a method for monitoring a server provided by the invention.

Figure 2:
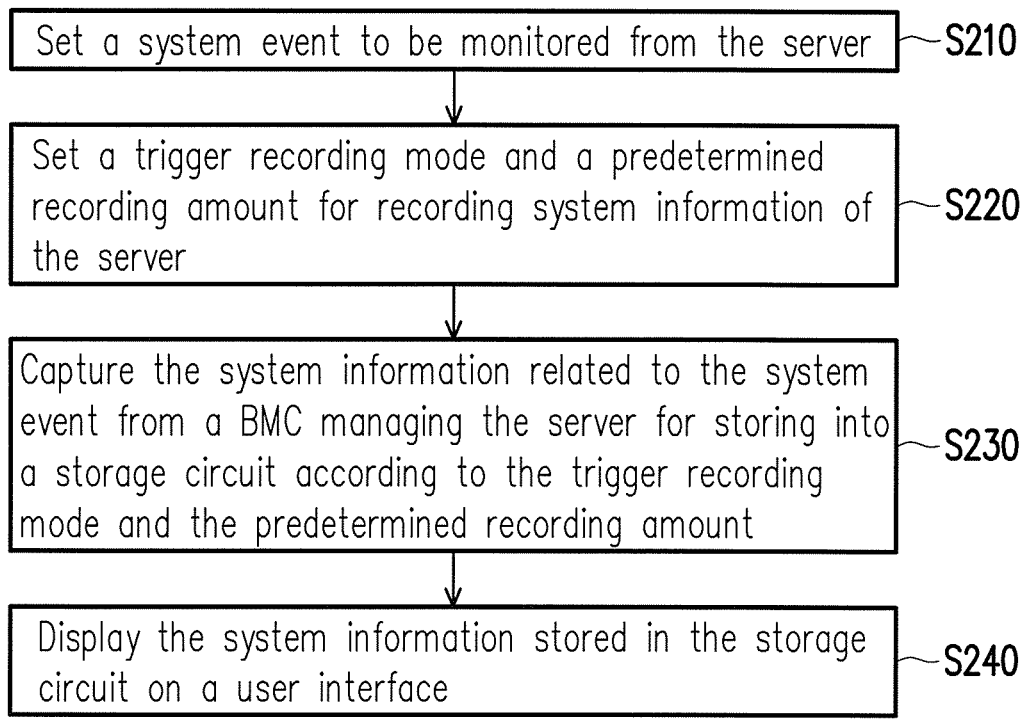
FIG. 2 is a flowchart illustrating a method for monitoring a server according to an embodiment of the invention.

FIG. 2 is a flowchart illustrating a method for monitoring a server according to an embodiment of the invention. The method of the present embodiment can be executed by the monitoring device of FIG. 1, and detailed steps of the method are described below with reference of various components of FIG. 1.

In step S210, the system setting module 110_1 sets a system event to be monitored from the server 300. The system event is, for example, an event causing shutdown, system failure or malfunction of the server 300, or other event defined in the IPMI standard that is to be monitored by the system manager. For example, the system event can be a certain general purpose input/output (GPIO) state (for example, a platform reset pin in a low level or a falling edge), a certain string (for example, "error") of a BMC debug console, or a certain specific system event log (SEL) record (for example, "FRB2 watch dog timeout"), etc., though the invention is not limited thereto.

Then, in step S220, the system setting module 110_1 sets a trigger recording mode and a predetermined recording amount for recording system information of the server 300.

In an embodiment, the system information of the server 300 is, for example, system information defined in the IPMI standard, which includes at least one of a basic input/output system (BIOS) power-on self test (POST) code, a module-specific register (MSR) of a central processing unit (CPU), a serial over LAN (SOL; and LAN=local area network), and a debug console of the BIOS, a GPIO state of the server 300, a sensor of the BMC 200, a keyboard/video/mouse over Internet protocol (iKVM) image and a fan speed, though the invention is not limited thereto. In a different embodiment, the trigger recording mode, for example, includes a pre-trigger recording mode, a middle recording mode and a post-trigger recording mode, and the predetermined recording amount represents an amount of required system information. Schematically, the aforementioned three trigger recording modes are respectively configured to record the predetermined recording amount of system information before and/or after the system event occurs. For example, assuming that the system information, the trigger recording mode and the predetermined recording amount set by the system setting module 110_1 are respectively the BIOS POST codes, the pre-trigger recording mode and 10, the captured information for the system manager is 10 batches of the BIOS POST codes recorded before the system event occurs. For another example, assuming that the system information, the trigger recording mode and the predetermined recording amount set by the system setting module 110_1 are respectively the SOL, the post-trigger recording mode and 20, the captured information for the system manager is 20 batches of the SOL after the system event occurs.

After the step S220, in step S230, the system information capturing module 110_2 captures system information related to the system event from the BMC 200 managing the server 300 for storing to the storage circuit 110 according to the trigger recording mode and the predetermined recording amount. Namely, the system information capturing module 110_2 may capture a plurality of related system information recorded before and/or after the system event occurs. Moreover, in step S240, the display module 110_3 displays the system information stored in the storage circuit 110 on the user interface 130. In this way, the system manager may trace an operating status of the server 300 at the moment when the system event occurs according to the plurality of display information, so as to improve a debug convenience.

As described above, the trigger recording mode of the present embodiment of the invention may include the pre-trigger recording mode, the middle recording mode and the post-trigger recording mode, and details of the above three trigger recording modes are described below with reference of FIG. 3.

Figure 3:
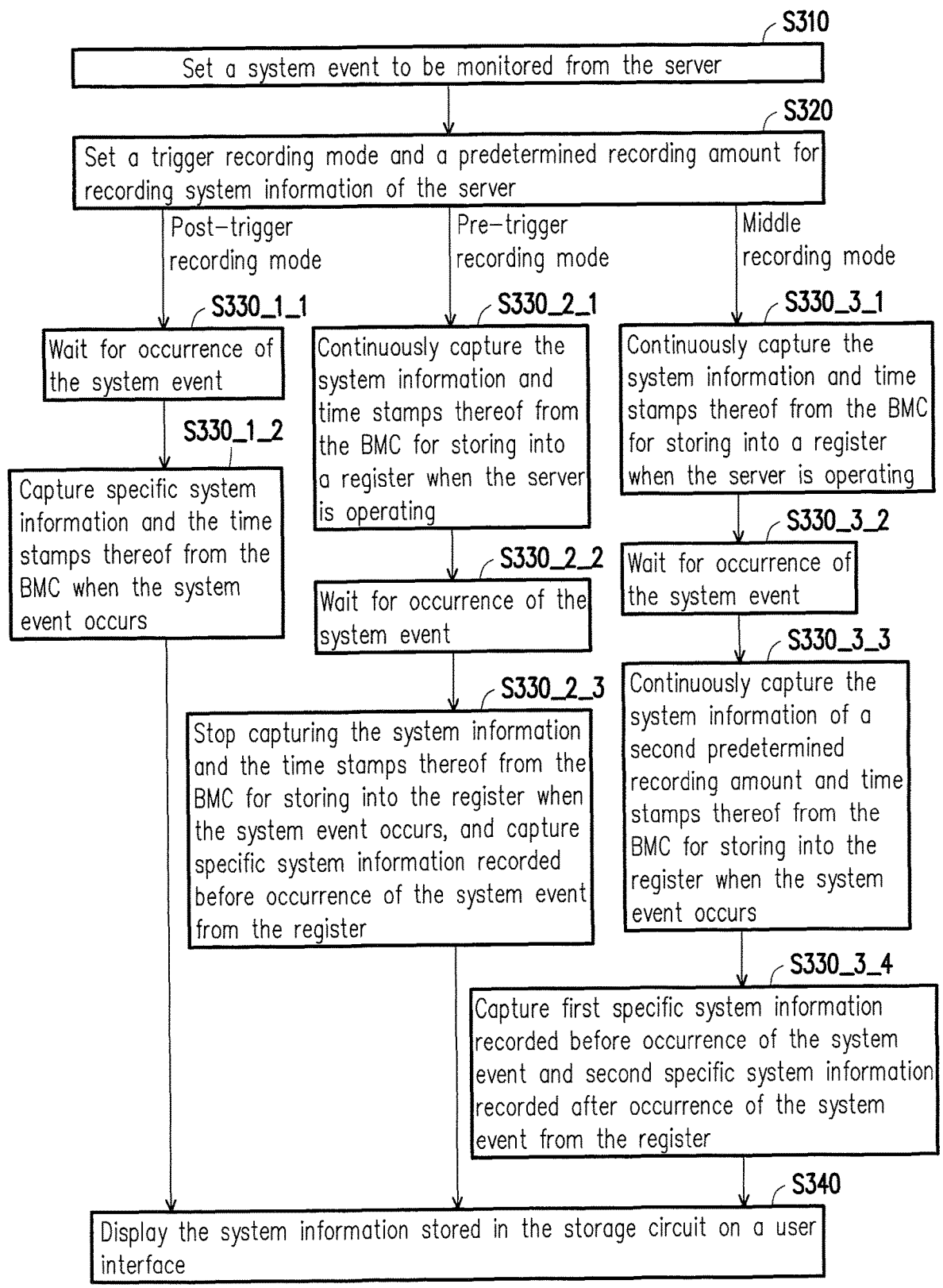
FIG. 3 is a flowchart illustrating a method for monitoring a server according to the embodiment of FIG. 2.

FIG. 3 is a flowchart illustrating a method for monitoring a server according to the embodiment of FIG. 2. The method of the present embodiment can be execute by the monitoring device of FIG. 1, and detailed steps of the method of the embodiment are described below with reference of various components of FIG. 1.

First, in step S310, the system setting module 110_1 sets a system event to be monitored from the server 300. In step S320, the system setting module 110_1 sets a trigger recording mode and a predetermined recording amount for recording system information of the server 300. Details of the steps S310 and S320 may refer to related descriptions of the steps S210 and S220 of FIG. 2, which will not be repeated herein.

In a first embodiment, if the trigger recording mode set by the system setting module 110_1 is the post-trigger recording mode, the system information capturing module 110_2 may execute a step S330_1_1 to wait for occurrence of the system event when the server 300 is operating. Then, in step S330_1_2, when the system event occurs, the system information capturing module 110_2 captures specific system information and time stamps thereof from the BMC 200, where an amount of the specific system information is the predetermined recording amount. For simplicity's sake, it is assumed that the system event to be monitored and the predetermined recording amount are respectively a string "FRB2 watch dog timeout" in the SEL record and 20. Moreover, the system information to be recorded is assumed to be the BIOS POST codes of the server 300 and all of the GPIO states of the server 300. Namely, under the above assumption, the system information capturing module 110_2 may capture 20 batches of the BIOS POST codes and the individual time stamps thereof recorded after the system event occurs from the BMC 200. Meanwhile, the system information capturing module 110_2 may capture 20 batches of data and the individual time stamps thereof recorded after the system event occurs from the GPIO states. Then, the system information capturing module 110_2 may store the captured data to the storage circuit 110. Then, in step S340, the display module 110_3 displays the system information stored in the storage circuit 110 on the user interface 130. In this way, the system manager may perform debugging according to the displayed system information.

In a second embodiment, if the trigger recording mode set by the system setting module 110_1 is the pre-trigger recording mode, the system information capturing module 110_2 may execute a step S330_2_1 to continuously capture the system information and time stamps thereof from the BMC 200 for storing into a register when the server 300 is operating. The register is, for example, a dual inline memory module (DIMM), though the invention is not limited thereto. Then, in step S330_2_2, the system information capturing module 110_2 waits for occurrence of the system event. Then, in step S330_2_3, when the system event occurs, the system information capturing module 110_2 stops capturing the system information and time stamps thereof from the BMC 200 for storing into the register, and captures specific system information recorded before the system event occurs from the register, where an amount of the specific system information is the predetermined recording amount.

For simplicity's sake, it is assumed that the system event to be monitored and the predetermined recording amount are respectively "the CPU temperature exceeds a certain threshold" and 500. Moreover, the system information to be recorded is assumed to be CPU temperatures, iKVM images and fan speeds. Namely, under the above assumption, the system information capturing module 110_2 may capture 500 batches of CPU temperatures, iKVM images and fan speeds and the individual time stamps thereof recorded before the system event occurs from the register. Then, in step S340, the display module 110_3 displays the system information stored in the storage circuit 110 on the user interface 130. In this way, the system manager may perform debugging according to the displayed system information. To be specific, the system manager may observe a variation of the CPU temperatures recorded before occurrence of "the CPU temperature exceeds the certain threshold." If the CPU temperature is obviously increased from a certain time point, the system manager may learn the program executed by the server 300 at that moment from the iKVM images. Moreover, the system manager may learn whether occurrence of "the CPU temperature exceeds the certain threshold" is caused by failure of a certain fan according to the fan speeds.

For another example, it is assumed that the system event to be monitored and the predetermined recording amount are respectively a new string "power off" (i.e. the server is shut down) added in the SEL and 100. Moreover, the system information to be recorded is assumed to be iKVM images. Namely, under the above assumption, the system information capturing module 110_2 may capture 100 batches of iKVM images and the individual time stamps thereof recorded before the system event occurs from the register. In this way, the system manager may observe the program executed before the server 300 is shut down from the captured iKVM images, so as to learn whether the server 300 is shut down by an operator or shut down due to a program problem.

In a third embodiment, the system setting module 110_1 may set the trigger recording mode to the middle recording mode. In the present embodiment, the middle recording mode can be regarded as a combination of the pre-trigger recording mode and the post-trigger recording mode. In brief, the system information capturing module 110_2 may capture the system information of the first predetermined recording amount recorded before occurrence of the system event and the system information of the second predetermined recording amount recorded after occurrence of the system event for the reference of the system manager. To be specific, if the system setting module 110_1 sets the trigger recording mode to the middle recording mode, the system information capturing module 110_2 may execute a step S330_3_1 to continuously capture the system information and the time stamps thereof from the BMC 200 for storing into the register when the server 300 is operating. Thereafter, in step S330_3_2, the system information capturing module 110_2 waits for occurrence of the system event. Then, in step S330_3_3, when the system event occurs, the system information capturing module 110_2 continuously captures the system information of the second predetermined recording amount and the time stamps thereof from the BMC 200 for storing into the register. Then, in step S330_3_4, the system information capturing module 110_2 captures first specific system information recorded before occurrence of the system event and second specific system information recorded after occurrence of the system event from the register, where an amount of the first specific system information is the first predetermined recording amount, and an amount of the second specific system information is the second predetermined recording amount.

For simplicity's sake, it is assumed that the system event to be monitored, the first predetermined recording amount and the second predetermined recording amount are respectively a string "FRB2 watch dog timeout" appeared in the SEL, 10 and 20. Moreover, the system information to be recorded is assumed to be the BIOS POST codes of the server 300 and all of the GPIO states of the server 300. Namely, under the above assumptions, the system information capturing module 110_2 may capture 10 batches of the BIOS POST codes and the individual time stamps thereof recorded before the system event occurs and 20 batches of the BIOS POST codes and the individual time stamps thereof recorded after the system event occurs from the register. Meanwhile, the system information capturing module 110_2 may capture 10 batches of data and the individual time stamps thereof recorded before the system event occurs and 20 batches of data and the individual time stamps thereof recorded after the system event occurs from the GPIO states. Then, the system information capturing module 110_2 may store the captured data to the storage circuit 110. Then, in step S340, the display module 110_3 displays the system information stored in the storage circuit 110 on the user interface 130. In this way, the system manager may debug according to the displayed system information.

In detail, when the string "FRB2 watch dog timeout" is appeared in the SEL, it represents that the BIOS of the server 300 is not normally booted. In this case, it is assumed that the system manager does not discover a new BIOS POST code in the 20 batches of BIOS POST codes recorded after the system event occurs, it represents that booting of the BIOS has failed. Now, the system manager may observe an executing phase of the BIOS from the 10 batches of BIOS post codes recorded before the system event occurs, and analyze a possible reason that causes the booting failure of the BIOS in collaboration with data related to the GPIO states recorded before the system event occurs.

On the other hand, it is assumed that the system manager discovers a new BIOS POST code in the 20 batches of BIOS POST codes recorded after the system event occurs, and meanwhile discovers a POST code for leaving the BIOS to enter an operating system (OS), it represents that the server 300 is still normally operating, and the system event of "FRB2 watch dog timeout" occurs only due to that a certain hardware device prolongs a booting time during the booting process. In this case, the system manager may get to learn the specific hardware device initialized by the BIOS that prolongs the booting time from the last BIOS POST code recorded before the system event occurs.

In an embodiment, the method for displaying the system information on the user interface 130 can be different along with a different type of the system information. For example, the BIOS POST codes can be presented through a following table 1.

TABLE 1

| Time stamp | BIOS POST code |
|---|---|
| 2015/8/3 13:10:5 | 1A |
| 2015/8/3 13:13:7 | 4C |

Figure 4A:
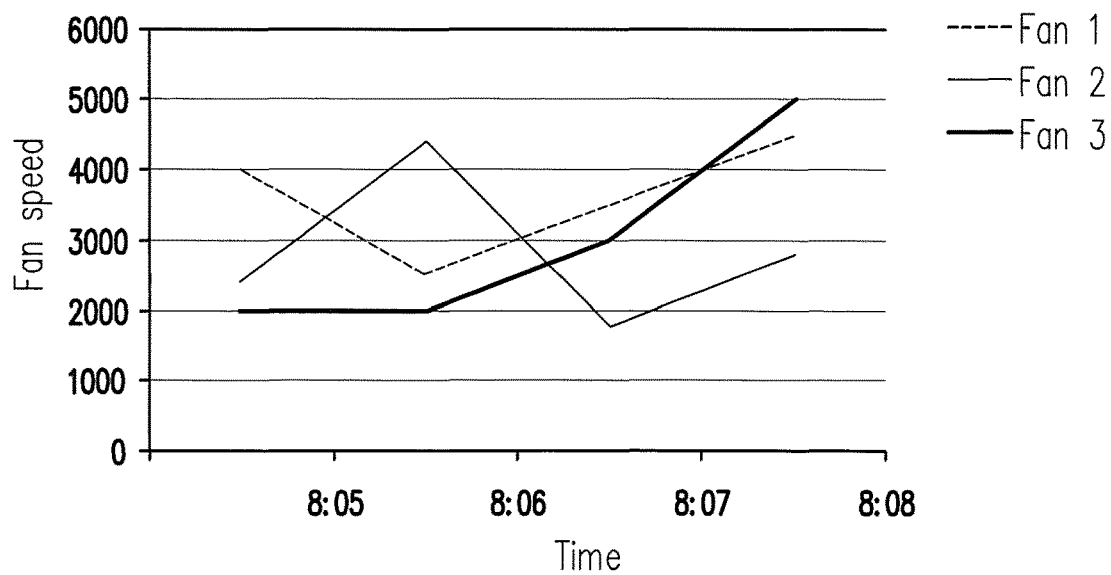
FIGS. 4A and 4B are respectively schematic diagrams of methods for presenting system information according to an embodiment of the invention.
Figure 4B:
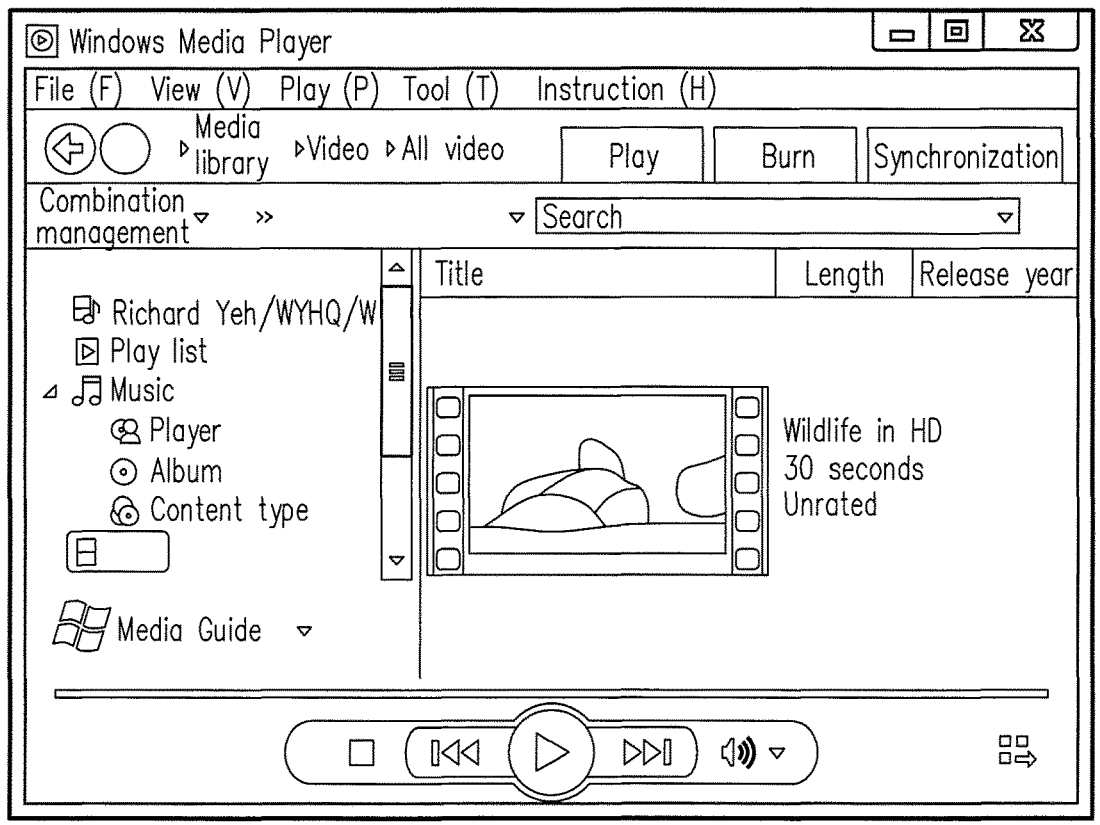

Referring to FIG. 4A and FIG. 4B, FIGS. 4A and 4B are respectively schematic diagrams of presenting system information according to an embodiment of the invention. In FIG. 4A, the fan speed of each of the fans at different time points can be presented by a polyline. In FIG. 4B, the iKVM images can be played through a media player for the reference of the system manager.

In the aforementioned embodiment, although the method of the invention only monitors one system event, in other embodiments, the method of the invention, may simultaneously monitor a plurality of system events and corresponding system information. Moreover, the predetermined recording amount corresponding to each system information can be adjusted by the system manager according to an actual requirement.

Moreover, in a different embodiment, the system information capturing module 110_2 may capture the system information according to a certain specific sampling frequency. For example, it is assumed that the sampling frequency of the system information capturing module 110_2 for capturing the iKVM images is 10 per second, and the required predetermined recording amount is 100. In this case, the system information capturing module 110_2 may capture images of total 10 seconds. For another embodiment, it is assumed that the sampling frequency of the system information capturing module 1102 for capturing the iKVM images is 1 per second, and the required predetermined recording amount is 100. In this case, the system information capturing module 110_2 may capture images of total 100 seconds. Moreover, when the system information capturing module 110_2 captures the system information based on the sampling frequency, the system information capturing module 110_2 may only store the time stamps of several batches of the system information (for example, a first batch of the system information). To be specific, since a time interval between two batches of continuous system information is a reciprocal of the sampling frequency, the time stamps of the other system information can be easily deduced. However, regarding the type of data with unfixed generation time such as the POST codes, the system information capturing module 1102 may record the time stamps thereof each time when the POST code is added.

Figure 5:
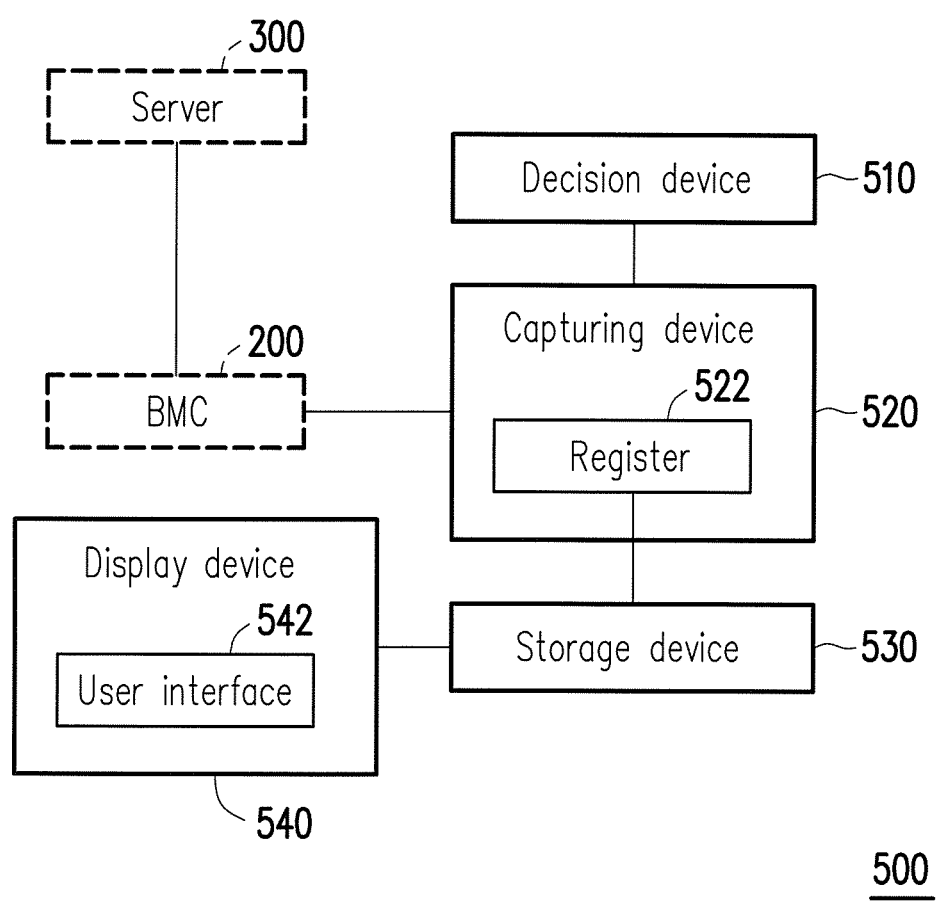
FIG. 5 is a schematic diagram of a monitoring system according to an embodiment of the invention.

In an embodiment, the components in the monitoring device 100 can be implemented by independent devices, so as to construct a monitoring system for monitoring the BMC, as shown in FIG. 5. FIG. 5 is a schematic diagram of a monitoring system according to an embodiment of the invention. In the present embodiment, the monitoring system 500 includes a decision device 510, a capturing device 520, a storage device 530 and a display device 540. The capturing device 510 may include a register 522, and the display apparatus 540 may include a user interface 542. The method for the decision device 510, the capturing device 520 and the display device 540 monitoring the BMC 200 managing the server 300 may refer to related description of the system setting module 110_1, the system information capturing module 110_2 and the display module 110_3 of the aforementioned embodiment, and details thereof will not be repeated herein.

In summary, according to the method for monitoring the server, the monitoring device and the monitoring system of the invention, the predetermined amount of system information recorded before and/or after occurrence of the system event can be captured according to the used trigger recording mode. In this way, the system manager may trace the system status at the moment when the system event occurs based on the captured system information, so as to improve debugging convenience. Moreover, since it is unnecessary to continuously store all of the system information, but only the system information recorded before and/or after the system event occurs is stored, the method of the invention may decrease a storage burden of the storage circuit.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for monitoring a server, the method executed by a processor comprising:
    setting a system event to be monitored from the server;
    setting specific system information to be recorded according to the system event to be monitored, wherein the specific system information to be recorded is related to the system event to be monitored;
    setting a trigger recording mode by selecting a mode from a pre-trigger recording mode, a middle recording mode and a post-trigger recording mode based on the system event to be monitored;
    setting a predetermined recording amount for recording the specific system information, wherein the predetermined recording amount represents a quantity of the specific system information;
waiting for the system event;
capturing the predetermined recording amount of the specific system information in response to the system event from a baseboard management controller and storing the captured specific system information into a register according to the trigger recording mode and the predetermined recording amount, wherein the captured specific system information is related to the system event, the system event occurs when the server is operating, and the baseboard management controller manages the server;
transferring the specific system information stored in the register from the register to a storage circuit and stopping the capturing of the specific system information for storing into the register according to the trigger recording mode and the predetermined recording amount; and
displaying the specific system information stored in the storage circuit on a user interface.

2. The method for monitoring the server as claimed in claim 1, wherein when setting the trigger recording mode as the pre-trigger recording mode, capturing the predetermined recording amount of the specific system information related to the system event from the baseboard management controller managing the server for storing into register according to the trigger recording mode and the predetermined recording amount comprises:
continuously capturing the specific system information and time stamps thereof from the baseboard management controller for storing into the register when the server is operating;
waiting for an occurrence of the system event; and
stopping capturing the specific system information and the time stamps thereof from the baseboard management controller for storing into the register when the system event occurs, and capturing the specific system information recorded before the occurrence of the system event from the register according to the predetermined recording amount.

3. The method for monitoring the server as claimed in claim 1, wherein when setting the trigger recording mode as the post-trigger recording mode, capturing the predetermined recording amount of the specific system information related to the system event from the baseboard management controller managing the server for storing into the register according to the trigger recording mode and the predetermined recording amount comprises:
waiting for an occurrence of the system event when the server is operating; and
capturing the specific system information and time stamps thereof recorded after the occurrence of the system event from the baseboard management controller.

4. The method for monitoring the server as claimed in claim 1, wherein when setting the trigger recording mode as the middle recording mode, the predetermined recording amount comprises a first predetermined recording amount and a second predetermined recording amount, and capturing the predetermined recording amount of the specific system information related to the system event from the baseboard management controller managing the server for storing into the register according to the trigger recording mode and the predetermined recording amount comprises:
continuously capturing the specific system information and time stamps thereof from the baseboard management controller for storing into the register when the server is operating;
waiting for an occurrence of the system event;
continuously capturing the specific system information according to the second predetermined recording amount and time stamps thereof from the baseboard management controller for storing into the register when the system event occurs; and
capturing first specific system information recorded before the occurrence of the system event and second specific system information recorded after the occurrence of the system event from the register, wherein an amount of the first specific system information is the first predetermined recording amount, and an amount of the second specific system information is the second predetermined recording amount.

5. The method for monitoring the server as claimed in claim 1, wherein the specific system information comprises at least one of a power-on self test code of a basic input/output system, a module-specific register of a central processing unit, a serial over local area network, a debug console of the basic input/output system, a general purpose input/output state of the server, a sensor of the baseboard management controller, a keyboard/video/mouse over Internet protocol image and a fan speed.

6. A monitoring device, comprising:
a user interface;
a storage circuit, including a plurality of modules; and
a processor, coupled to the storage circuit and the user interface, and accessing and executing the modules, wherein the modules comprise:
a system setting module, setting a system event to be monitored from a server, setting specific system information to be recorded according to the system event to be monitored, wherein the specific system information to be recorded is related to the system event to be monitored, setting a trigger recording mode by selecting a mode from a pre-trigger recording mode, a middle recording mode and a post-trigger recording mode based on the system event to be monitored, and setting a predetermined recording amount for recording the specific system information, wherein the predetermined recording amount represents a quantity of the specific system information;
a system information capturing module, waiting for the system event, capturing the predetermined recording amount of the specific system information in response to the system event from a baseboard management controller and storing the captured specific system information into a register according to the trigger recording mode and the predetermined recording amount, and transferring the specific system information stored in the register from the register to the storage circuit and stopping capturing the specific system information for storing into the register according to the trigger recording mode and the predetermined recording amount, wherein the captured specific system information is related to the system event, the system event occurs when the server is operating, and the baseboard management controller manages the server; and
a display module, displaying the specific system information stored in the storage circuit on the user interface.

7. The monitoring device as claimed in claim 6, wherein when the system setting module sets the trigger recording mode as the pre-trigger recording mode, the system information capturing module is configured to:
   continuously capture the specific system information and time stamps thereof from the baseboard management controller for storing into the register when the server is operating;
   wait for an occurrence of the system event; and
   stop capturing the specific system information and the time stamps thereof from the baseboard management controller for storing into the register when the system event occurs, and capture the specific system information recorded before the occurrence of the system event from the register according to the predetermined recording amount.

8. The monitoring device as claimed in claim 6, wherein when the system setting module sets the trigger recording mode as the post-trigger recording mode, the system information capturing module is configured to:
   wait for an occurrence of the system event when the server is operating; and
   capture the specific system information and time stamps thereof recorded after the occurrence of the system event from the baseboard management controller when the system event occurs.

9. The monitoring device as claimed in claim 6, wherein when the system setting module sets the trigger recording mode as the middle recording mode, the predetermined recording amount comprises a first predetermined recording amount and a second predetermined recording amount, and the system information capturing module is configured to:
   continuously capture the specific system information and time stamps thereof from the baseboard management controller for storing into the register when the server is operating;
   wait for an occurrence of the system event;
   continuously capture the specific system information according to the second predetermined recording amount and time stamps thereof from the baseboard management controller for storing into the register when the system event occurs; and
   capture first specific system information recorded before occurrence of the system event and second specific system information recorded after occurrence of the system event from the register, wherein an amount of the first specific system information is the first predetermined recording amount, and an amount of the second specific system information is the second predetermined recording amount.

10. The monitoring device as claimed in claim 6, wherein the specific system information comprises at least one of a power-on self test code of a basic input/output system, a module-specific register of a central processing unit, a serial over local area network, a debug console of the basic input/output system, a general purpose input/output state of the server, a sensor of the baseboard management controller, a keyboard/video/mouse over Internet protocol image and a fan speed.

* * * * *